United States Patent
Arai (10) Patent No.: US 7,359,788 B2
(45) Date of Patent: Apr. 15, 2008

(54) APPARATUS FOR CONTROLLING DISTANCE BETWEEN VEHICLES

(75) Inventor: Toshiaki Arai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 648 days.

(21) Appl. No.: 11/029,083

(22) Filed: Jan. 3, 2005

(65) Prior Publication Data

US 2005/0187698 A1    Aug. 25, 2005

(30) Foreign Application Priority Data

Feb. 19, 2004    (JP)    ............... 2004-042926

(51) Int. Cl.
*B60T 7/12* (2006.01)
*G08G 1/16* (2006.01)

(52) U.S. Cl. ............... 701/96; 701/70; 340/903

(58) Field of Classification Search .............. 701/70, 701/96; 180/170; 340/436, 903
See application file for complete search history.

(56) References Cited

U.S. PATENT DOCUMENTS 6,854,548 B2 *    2/2005    Kuroda et al. ............ 180/170
7,280,903 B2 *    10/2007   Arai et al. ............... 701/96
2004/0195022 A1 *  10/2004   Inoue .................... 180/170

FOREIGN PATENT DOCUMENTS

| JP | 08-127268 | 5/1996 |
|----|-----------|--------|
| JP | 2000-225869 | 8/2000 |
| JP | 2002-225589 | 8/2002 |
| JP | 2003-137003 | 5/2003 |
| JP | 2003-306055 | 10/2003 |
| JP | 2004-009885 | 1/2004 |

* cited by examiner

*Primary Examiner*—Mark Hellner
(74) *Attorney, Agent, or Firm*—O'Melveny & Myers LLP (57) ABSTRACT

An apparatus for controlling the distance between vehicles enables the distance to be controlled smoothly. A target vehicle speed determining section sets target vehicle speed based on the distance deviation between actual inter-vehicular distance and target inter-vehicular distance between host vehicle and preceding vehicle, and on the traveling speed of the preceding vehicle; calculates a temporary target vehicle speed based on traveling speed of the preceding vehicle and on the distance deviation; calculates a predicted arrival time for the host vehicle to reach the preceding vehicle based on the actual inter-vehicular distance and on the relative speeds between the two vehicles; and calculates a target vehicle speed limit value based on this predicted arrival time and on the traveling speed of the host vehicle, and sets as the target vehicle speed a value obtained by limiting the temporary target vehicle speed using this target vehicle speed limit value.

8 Claims, 9 Drawing Sheets

APPARATUS FOR CONTROLLING DISTANCE BETWEEN VEHICLES

BACKGROUND OF THE INVENTION

1. Field of the Invention

Priority is claimed on Japanese Patent Application No. 2004-42926, filed Feb. 19, 2004, the contents of which are incorporated herein by reference.

The present invention relates to an apparatus for controlling the distance between vehicles that controls a vehicle such that a distance between the vehicle and a preceding vehicle is kept at an appropriate distance.

2. Description of Related Art

Conventionally, apparatuses for controlling the distance between vehicles (referred to below as inter-vehicular distance control), which control a vehicle such that the distance between this vehicle (referred to below as the "host vehicle") and the vehicle (referred to below as the "preceding vehicle") traveling immediately in front of this vehicle is kept at an appropriate distance, have included those that execute inter-vehicular distance control using a pseudo inter-vehicular distance. This pseudo inter-vehicular distance is a distance that is obtained, in cases when the actual inter-vehicular distance between a host vehicle and a preceding vehicle abruptly changes such as when, for example, a new preceding vehicle cuts in between the host vehicle and the preceding vehicle that the host vehicle is currently following, or when a distant preceding vehicle is recognized as the new preceding vehicle after the preceding vehicle that the host vehicle had hitherto been following has changed lanes, by gradually changing the actual inter-vehicular distance immediately before this abrupt change instead of the actual inter-vehicular distance after the abrupt change. In these apparatuses, by performing control such that the difference between the pseudo inter-vehicular distance and the target inter-vehicular distance is gradually increased, gentle inter-vehicular distance control becomes possible and it is possible to prevent abrupt acceleration or deceleration control from being executed in a vehicle in reaction to an abruptly changed actual inter-vehicular distance (see, for example, Japanese Patent Application Unexamined Publication No. 08-127268).

In the same way, there are also apparatuses that, when the actual inter-vehicular distance between a host vehicle and a preceding vehicle has abruptly changed, instead of altering the actual inter-vehicular distance, alter the target inter-vehicular distance that is the target of the control from a set target inter-vehicular distance that was set initially to a provisional (i.e., temporary) target inter-vehicular distance that is based on the actual inter-vehicular distance after the change. By performing this control, these apparatuses gradually change the provisional target inter-vehicular distance so that it approaches the originally set target inter-vehicular distance. In this case as well, by performing control such that the difference between the actual inter-vehicular distance after the change and the provisional target inter-vehicular distance is gradually increased, gentle inter-vehicular distance control becomes possible and it is possible to prevent abrupt acceleration or deceleration control from being executed in a vehicle in reaction to an abruptly changed actual inter-vehicular distance.

In a conventional apparatus, because the pseudo inter-vehicular distance that is used for control and the set target inter-vehicular distance that is the target of the control are temporarily altered to a value that is based on the distance between the host vehicle after the change and the preceding vehicle, when the preceding vehicle is traveling at a constant speed, it is possible to restore the inter-vehicular distance between the host vehicle and the preceding vehicle smoothly to the target distance. However, particularly when a new preceding vehicle cuts in between the host car and the preceding vehicle that the host car had been following and it is then further assumed that this new preceding vehicle will decelerate, the problem arises that complex control becomes necessary. Moreover, a large load is placed on the apparatus due to the complexity of the control which makes it difficult to reduce the size and cost of the apparatus.

Furthermore, because control of the inter-vehicular distance between a host vehicle and the preceding vehicle that the host vehicle is following does not need to be carried out for each newly recognized preceding vehicle, it becomes necessary to determine whether or not control of the inter-vehicular distance is to be executed or is not to be executed so that this control is made even more complex. In addition, because the driving sensation changes depending on the existence or otherwise of processing to control the inter-vehicular distance, there is a possibility that the driver will be made to feel an uncomfortable sensation.

The present invention was conceived in view of the above described circumstances and it is an object thereof to provide an apparatus for controlling the distance between vehicles that is able to smoothly control the distance between vehicles in accordance with changes in the traffic situation surrounding a vehicle using a simple processing.

SUMMARY OF THE INVENTION

In order to solve the above described problems, according to the present invention, there is provided an apparatus for controlling the distance between vehicles comprising: a host vehicle speed detection device (for example, the vehicle speed sensor 17 of the embodiment described below) that detects a traveling speed of a host vehicle; a preceding vehicle determining device (for example, the preceding vehicle determining section 14 of the embodiment described below) that determines which is a preceding vehicle; a target inter-vehicular distance setting device (for example, the target vehicle space determining section 15 of the embodiment described below) that sets a target inter-vehicular distance between the preceding vehicle and the host vehicle; an actual inter-vehicular distance detecting device (for example, the preceding vehicle determining section 14 of the embodiment described below) that detects an actual inter-vehicular distance between the preceding vehicle and the host vehicle; a preceding vehicle speed calculating device (for example, the target vehicle speed determining section 16 of the embodiment described below) that calculates a traveling speed of the preceding vehicle; a distance deviation calculating device (for example, the target vehicle speed determining section 16 of the embodiment described below) that calculates a distance deviation between the target inter-vehicular distance and the actual inter-vehicular distance; a target vehicle speed setting device (for example, the target vehicle speed determining section 16 of the embodiment described below) that sets a target vehicle speed based on the traveling speed of the preceding vehicle and on the distance deviation; and an acceleration/deceleration control unit (for example, the throttle control section 11, the brake control section 12, and the brake hydraulic pressure determining section 13 of the embodiment described below) that controls an acceleration and a deceleration of the host vehicle based on the target vehicle speed, wherein the target vehicle speed setting device comprises: a predicted arrival time calculating device (for example, the processing of step S1 that is executed by the range limiter 22 of the embodiment described below) that calculates a predicted arrival time when the host vehicle will reach the preceding vehicle based on the actual inter-vehicular distance and on a relative speed between the preceding vehicle and the host vehicle; and a target vehicle speed limiting device (for example, the processing of steps S2 through S7 that is executed by the range limiter 22 of the embodiment described below) that calculates a target vehicle speed limit value based on the predicted arrival time and on the traveling speed of the host vehicle, and the target vehicle speed setting device sets a target vehicle speed based on the target vehicle speed limit value.

With an apparatus for controlling the distance between vehicles that has the above described structure, when the acceleration/deceleration control unit controls the acceleration and deceleration of the host vehicle based on the target vehicle speed that has been set, the predicted arrival time calculating device predicts a predicted arrival time, which is the length of time for the host vehicle and the preceding vehicle to approach each other until the host vehicle reaches the preceding vehicle, based on the relative speed between the host vehicle and the preceding vehicle and on the actual inter-vehicular distance between the host vehicle and the preceding vehicle. In addition, the target vehicle speed limiting device calculates a target vehicle speed limit value used to limit the target vehicle speed to within a predetermined range from the predicted arrival time that has been predicted and from the traveling speed of the host vehicle, and the target vehicle speed setting device sets a target vehicle speed that is limited by the target vehicle speed limit value. As a result, while inter-vehicular distance control between the host vehicle and the preceding vehicle is being executed without the target inter-vehicular distance settings being altered, the target vehicle speed can be limited to within predetermined values that are based on the predicted arrival time and on the traveling speed of the host vehicle, and it is possible to prevent the target vehicle speed from being changed greatly by changes in the traffic situation surrounding the host vehicle.

Preferably, in the apparatus for controlling the distance between vehicles as described above, the target vehicle speed setting device takes a value obtained by subtracting a target vehicle speed limit value from the traveling speed of the preceding vehicle as a target vehicle speed lower limit value.

With an apparatus for controlling the distance between vehicles having the above described structure, as a result of the target vehicle speed setting device limiting the lower limit value of the target vehicle speed using a value obtained by subtracting a target vehicle speed limit value from the traveling speed of the preceding vehicle as a target vehicle speed lower limit value, it becomes possible to set an appropriate target vehicle speed that corresponds with the traveling speed of the preceding vehicle, and it is possible to prevent the target vehicle speed from abruptly dropping to a lower speed in response to a change in the traffic situation around the host vehicle, and to thereby prevent the consequent sudden braking of the host vehicle.

Preferably, in the apparatus for controlling the distance between vehicles as described above, as the predicted arrival time increases, the target vehicle speed setting device reduces the target vehicle speed limit value.

With an apparatus for controlling the distance between vehicles having the above described structure, when there is an extended predicted arrival time, as a result of the target vehicle speed limiting device reducing the target vehicle speed limit value, the target vehicle speed setting device is able to set an appropriate target vehicle speed in accordance with the relative positional relationship between the host vehicle and the preceding vehicle and with the ongoing state thereof.

Preferably, in the apparatus for controlling the distance between vehicles as described above, as the traveling speed of the host vehicle increases, the target vehicle speed setting device reduces the target vehicle speed limit value.

With an apparatus for controlling the distance between vehicles having the above described structure, when the traveling speed of the host vehicle is fast, as a result of the target vehicle speed limiting device reducing the target vehicle speed limit value, the target vehicle speed setting device is able to set an appropriate target vehicle speed in accordance with the traveling speed of the host vehicle.

DETAILED DESCRIPTION OF THE INVENTION

An embodiment of the present invention will now be described with reference made to the drawings.

Apparatus Structure

Figure 1:
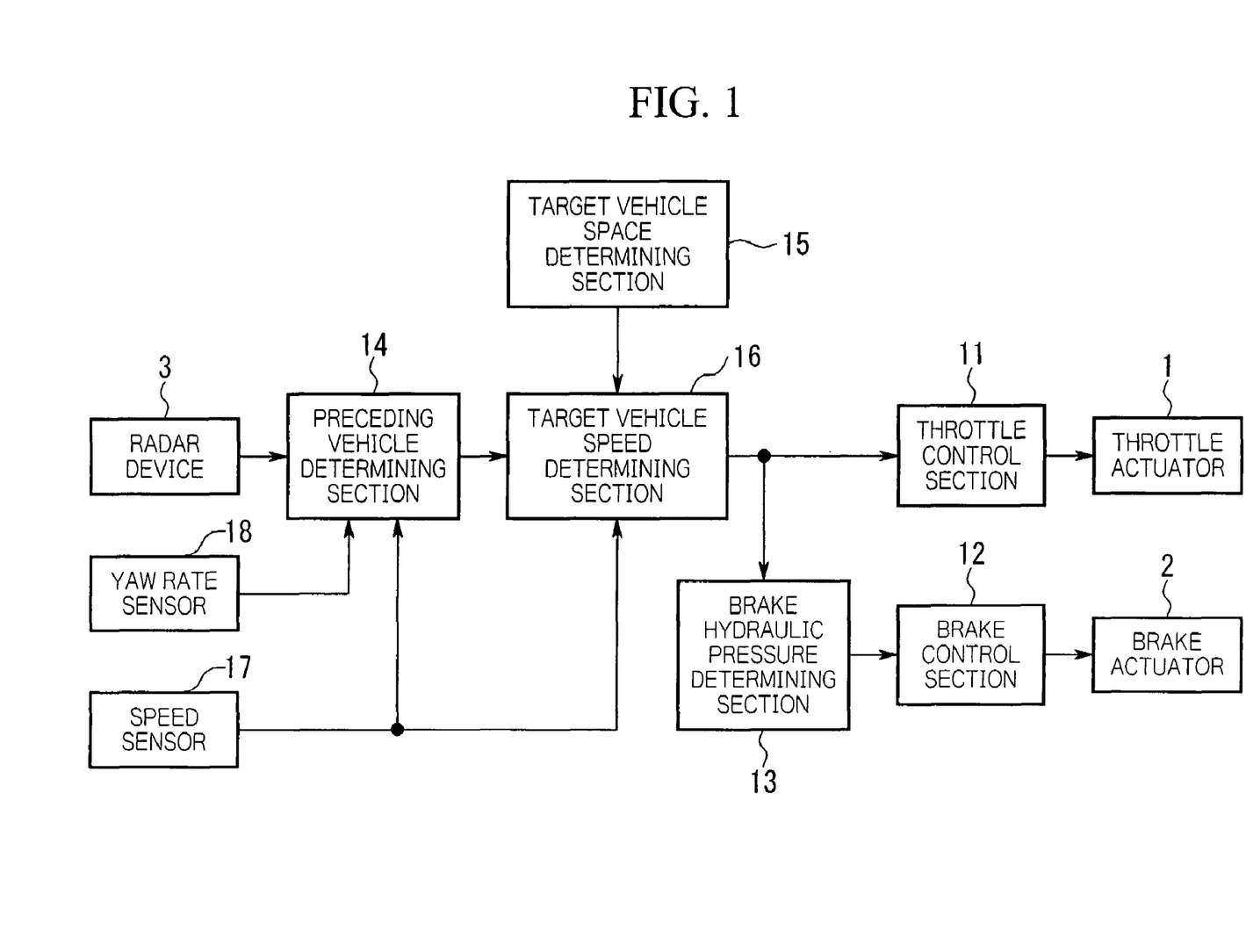
FIG. 1 is a block diagram showing the structure of an apparatus for controlling the distance between vehicles according to an embodiment of the present invention.

FIG. 1 is a block diagram showing the structure of an apparatus for controlling the distance between vehicles according to an embodiment of the present invention.

In FIG. 1, a throttle actuator 1 is a driving apparatus that operates the throttle of a host vehicle engine using hydraulic pressure or electricity.

A brake actuator 2 is a driving apparatus that moves the host vehicle brakes by hydraulic pressure in the same manner.

A radar device 3 is a radar device that is mounted in the front of the host vehicle in order to transmit radar waves around the host vehicle and also receive reflected radar waves that have been reflected by objects. The radar device 3 detects objects present in front of the host vehicle using the received reflected waves. Note that laser radar or radio wave radar or the like can be used for the radar device 3.

The apparatus for controlling the distance between vehicles of the present embodiment is provided with a throttle control section 11, a brake control section 12, a brake hydraulic pressure determining section 13, a preceding vehicle determining section 14, a target vehicle space determining section 15, and a target vehicle speed determining section 16 that serve as a processing section, which is realized by an ECU provided with a central processing unit (CPU).

Here, the throttle control section 11 is a processing section that, by setting a throttle aperture, controls the throttle actuator 1 that operates the throttle of the engine of the host vehicle.

The brake control section 12 is a processing section that controls the brake actuator 2 that operates the brakes of the host vehicle. The control of the brake actuator 2 by the brake control section 12 is executed based on a target brake fluid hydraulic pressure that is determined by the brake hydraulic pressure determining section 13.

The preceding vehicle determining section 14 is a processing section that processes information on an object in front of the host vehicle that has been captured by the radar device 3. The preceding vehicle determining section 14 is a processing section that calculates a travel trajectory of the host vehicle (i.e., a host vehicle trajectory) using a traveling speed of the host vehicle that has been measured by a speed sensor 17 that detects the traveling speed of the host vehicle, and using a yaw rate of the host vehicle that has been measured by a yaw rate sensor 18 that detects the yaw rate of the host vehicle. From the calculated host vehicle trajectory and from information on objects that are present in front of the host vehicle that has been output by the radar device 3, the preceding vehicle determining section 14 detects which preceding vehicle the host vehicle should be following, and also calculates object information that includes a distance between the detected preceding vehicle and the host vehicle (i.e., an inter-vehicle distance) and includes the relative speed of both.

The preceding vehicle determining section 14 determines the host vehicle trajectory by calculating a corner R of a road along which the host vehicle is traveling by, for example, dividing the traveling speed of the host vehicle by the yaw rate of the host vehicle. The preceding vehicle determining section 14 then recognizes a vehicle on an extension of this host vehicle trajectory as the preceding vehicle. The preceding vehicle determining section 14 also determines the lane along which the host vehicle is traveling by determining stationary objects such as cat's-eyes and lane markings that are provided along side portions of the vehicle lanes, and distinguishes between a preceding vehicle in the same lane as the host vehicle and other vehicles in adjacent lanes. Furthermore, when stopped, it distinguishes between a preceding vehicle and other vehicles using the trajectory of the host vehicle until it stopped.

The target vehicle space determining section 15 is a processing section that, based on an operation of a driver that is input via an inter-vehicle setting switch, determines a target inter-vehicular distance (i.e., a target inter-vehicular distance) between the host vehicle, which is controlled by the apparatus for controlling the distance between vehicles of the present embodiment, and a preceding vehicle. The target vehicle speed determining section 16 calculates the optimum traveling speed of the host vehicle as a target vehicle speed based on information on the distance from the preceding car and the relative speeds output by the preceding car determining section 14 (i.e., on object information), on the target inter-vehicular distance determined by the target vehicle space determining section 15, and on the current traveling speeds of the host vehicle measured by the vehicle speed sensor 17. The target vehicle speed determining section 16 then controls the throttle control section 11 and the brake hydraulic pressure determining section 13 such that the host vehicle travels at the target vehicle speed. Note that the target vehicle speed determining section 16 is described in detail below.

Specifically, if the target vehicle speed is faster than the host vehicle's current traveling speed, a command is issued to the throttle actuator 1 such that the throttle aperture output by the throttle control section 11 is increased and the number of engine revolutions is raised, thereby causing the host vehicle to accelerate. If, on the other hand, the target vehicle speed is slower than the host vehicle's current traveling speed, a command is issued to the brake actuator 2 such that the target brake fluid hydraulic pressure output by the brake hydraulic determining section 13 is increased and such that the brake control section 12 causes the brakes to be operated more firmly.

Structure of the Target Vehicle Speed Determining Section

Next, the aforementioned target vehicle speed determining section 16 will be described in detail with reference made to the drawings.

Figure 2:
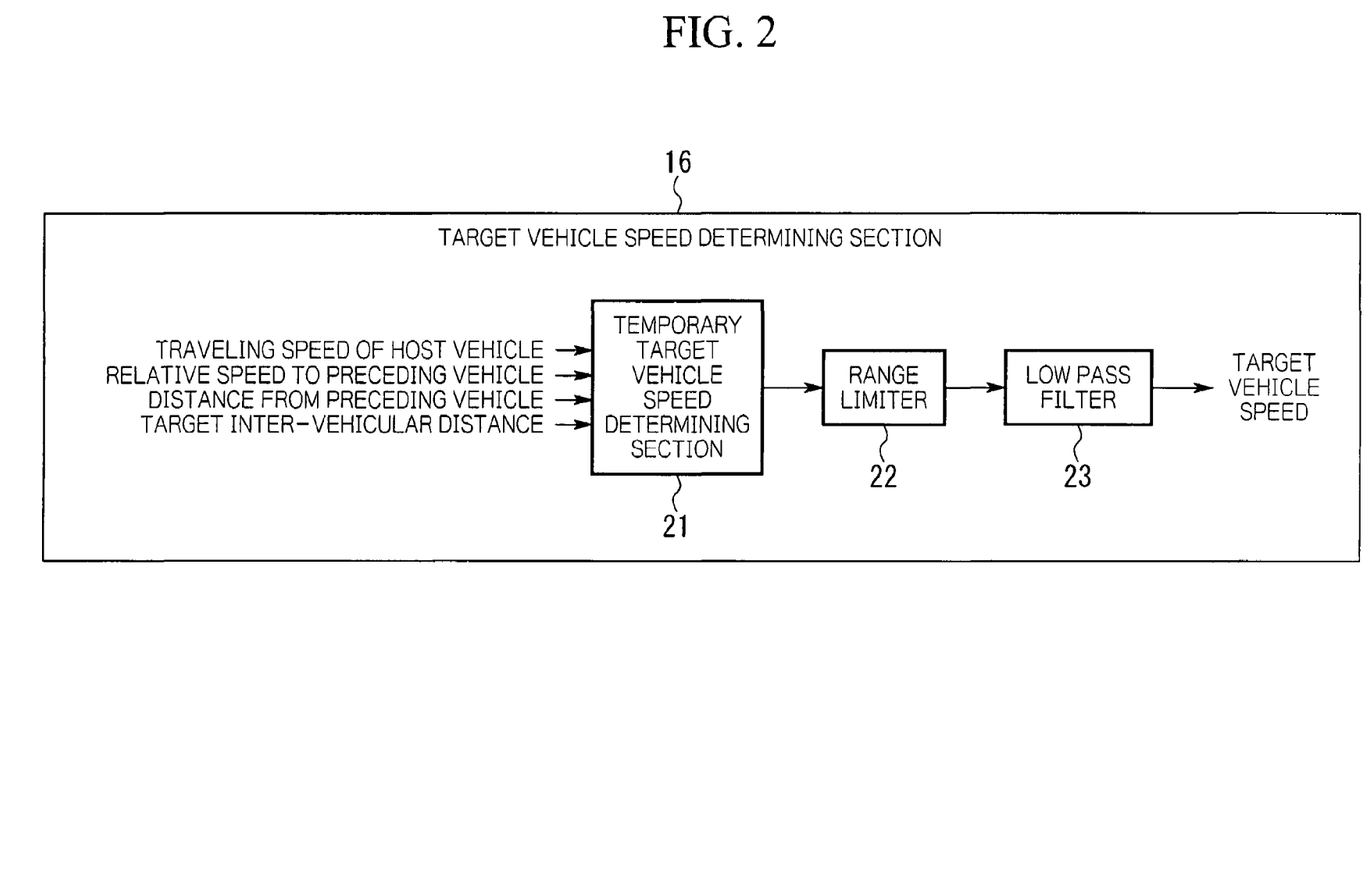
FIG. 2 is a block diagram showing the structure of a target vehicle speed determining section of the apparatus for controlling the distance between vehicles of the same embodiment.

FIG. 2 is a block diagram showing the structure of the target vehicle speed determining section 16 of the apparatus for controlling the distance between vehicles of the present embodiment.

In FIG. 2, the target vehicle speed determining section 16 is provided with a temporary target vehicle speed determining section 21, a range limiter 22, and a low pass filter 23.

Here, the temporary target vehicle speed determining section 21 is a processing section that calculates a temporary target vehicle speed for the host vehicle based on information on the distance from the preceding car and the relative speed of the host vehicle relative to the preceding vehicle that are output by the preceding car determining section 14 (i.e., on object information), on the target inter-vehicular distance determined by the target vehicle space determining section 15, and on the current traveling speeds of the host vehicle measured by the vehicle speed sensor 17.

Specifically, the temporary target vehicle speed determining section 21 calculates a temporary target vehicle speed for the host vehicle based on Formula (1) given below in which: [traveling speed of the preceding vehicle=traveling speed of the host vehicle+relative speed to the preceding vehicle]; [distance deviation=distance from preceding vehicle−target inter-vehicular distance]; and [α=distance gain].

$$\text{temporary target vehicle speed} = \text{traveling speed of preceding vehicle} + \text{distance deviation} \times \alpha \quad (1)$$

The range limiter 22 is a processing section that calculates the target vehicle speed of the host vehicle by applying a restriction to the calculated temporary target vehicle speed such that control that may cause the traveling speed of the host vehicle to abruptly change is not executed. This type of abrupt change may be the result of the temporary target traveling speed of the host vehicle that is calculated by the temporary target vehicle speed determining section 21 being an excessively large value or an excessively small value. Note that the target vehicle speed calculation operation of the range limiter 22 is described in detail below.

The low pass filter 23 is a processing section that removes high-frequency abrupt change portions such that changes in the target vehicle speed output by the range limiter 22 are gentle.

(Target Vehicle Speed Calculation Operation)

Next, the target vehicle speed calculation operation performed by the aforementioned range limiter 22 will be described with reference made to the drawings.

Figure 3:
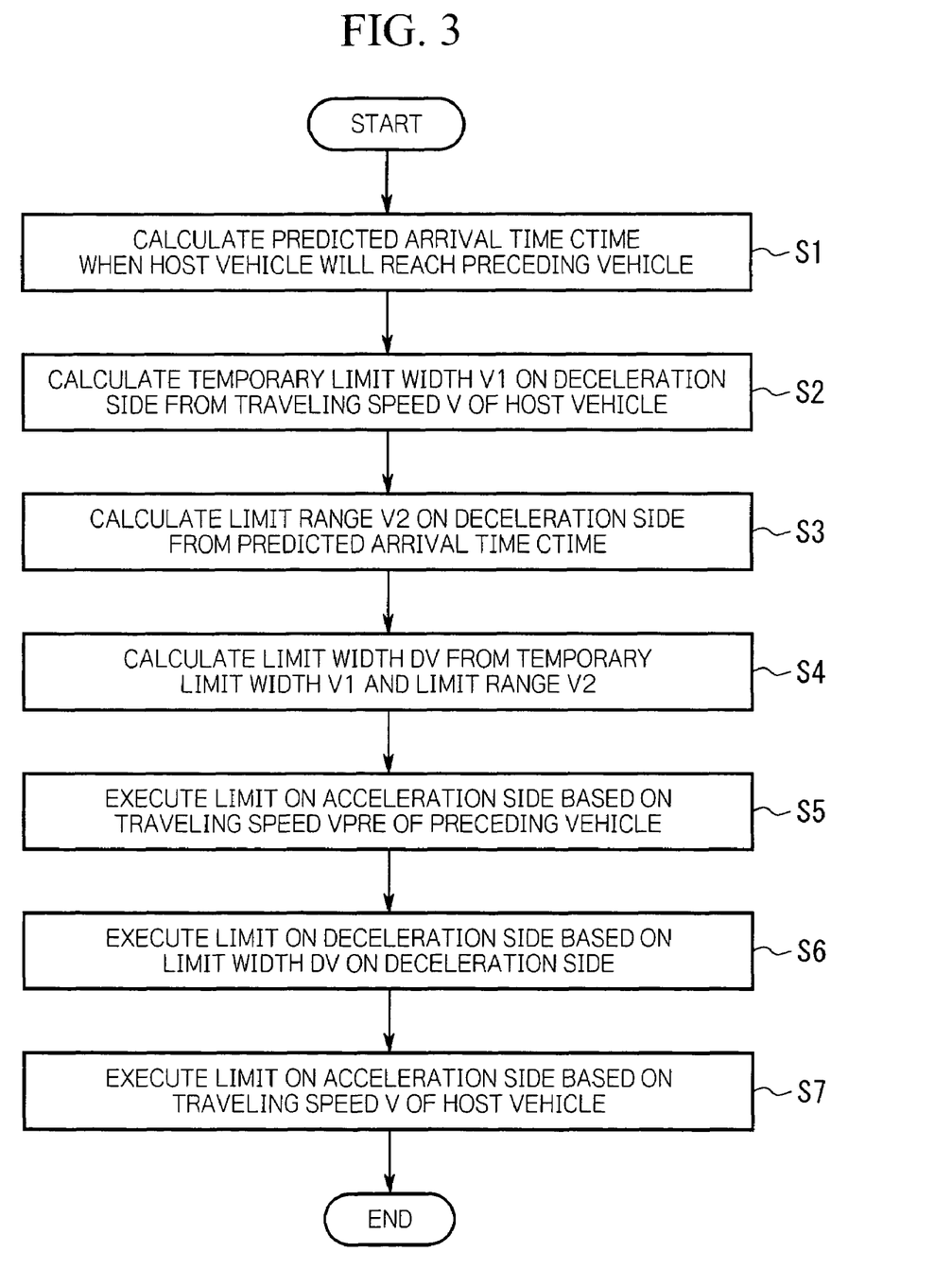
FIG. 3 is a flow chart showing a target vehicle speed calculation operation based on a range limiter of the apparatus for controlling the distance between vehicles of the same embodiment.

FIG. 3 is a flowchart showing a target vehicle speed calculation operation performed by the range limiter 22 of the apparatus for controlling the distance between vehicles of the present embodiment.

In FIG. 3, firstly, the range limiter 22 calculates a predicted arrival time ctime for the host vehicle to reach the preceding vehicle based on Formula (2) given below from the distance dt and the relative speed vr between the host vehicle and the preceding vehicle that are calculated by the preceding vehicle determining section 14 (step S1). Note that (vr<0) shows that the traveling speed of the host vehicle is faster than the traveling speed of the preceding vehicle and that the two vehicles are coming closer to each other.

$$Ctime=-dt/vr(\text{wherein } vr<0), ctime=\infty(\text{wherein } vr=0), \text{ and } ctime=\infty(\text{wherein } vr>0) \quad (2)$$

Figure 4:
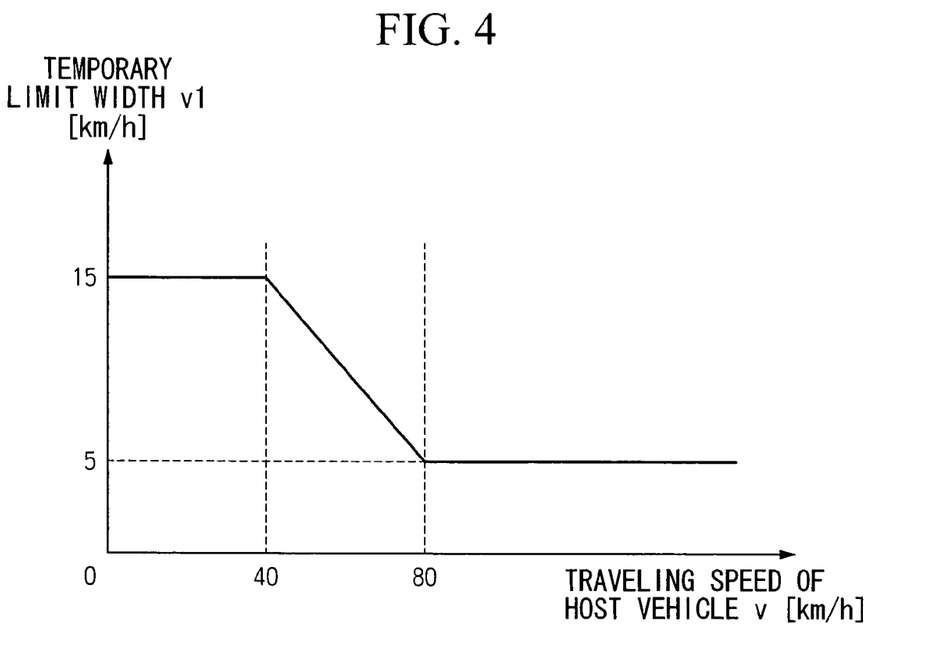
FIG. 4 is a view showing a control map used for calculating a temporary limit width v1 that is used by the range limiter.

Next, the range limiter 22 calculates a temporary limit width v1 on the deceleration side from the traveling speed v of the host vehicle using a control map used for calculating the temporary limit width v1 that is shown in FIG. 4 (step S2). For example, if the traveling speed v of the host vehicle is 80 [km/h] or more, the temporary limit width v1 is taken as 5 [km/h]. If the traveling speed v of the host vehicle is 40 [km/h] or less, the temporary limit width v1 is taken as 15 [km/h]. If, on the other hand, the traveling speed v of the host vehicle is faster than 40 [km/h] and slower than 80 [km/h], then a value determined from the graph in FIG. 4 is set for the temporary limit width v1.

Figure 5:
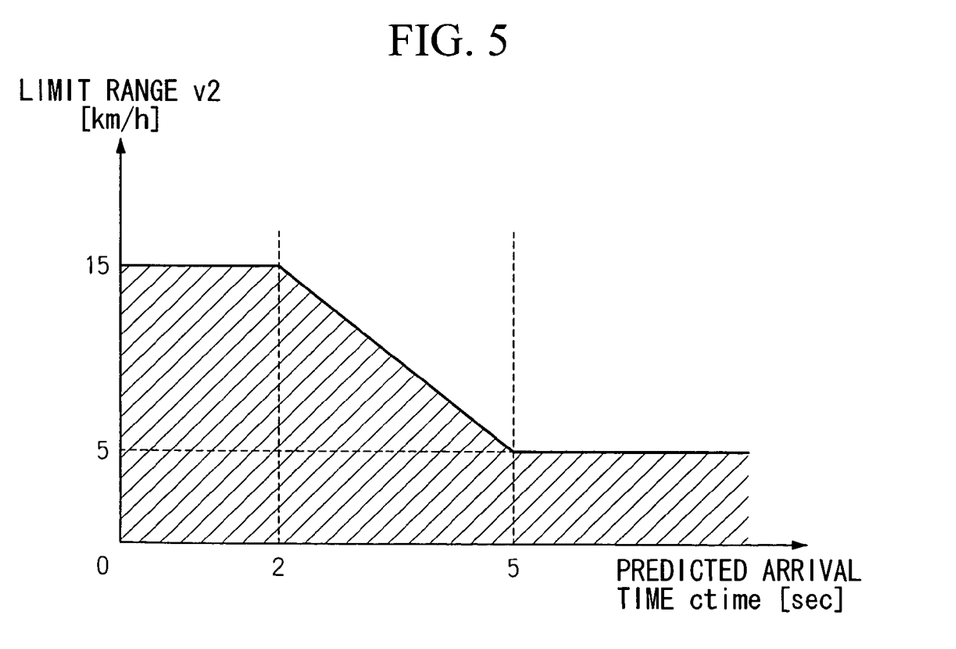
FIG. 5 is a view showing a control map used for calculating a temporary limit width v2 that is used by the range limiter.

The range limiter 22 also calculates a limit range v2 on the deceleration side from the predicted arrival time ctime for the host vehicle to reach the preceding vehicle that was calculated in step S1 using a control map for calculating the limit range v2 that is shown in FIG. 5 (step S3). For example, if the predicted arrival time when the host vehicle will reach the preceding vehicle is 5 [sec] or more, then the limit range v2 is set to 5 [km/h]. If the predicted arrival time when the host vehicle will reach the preceding vehicle is 2 [sec] or less, then the limit range v2 is set to 15 [km/h]. If the predicted arrival time when the host vehicle will reach the preceding vehicle is longer than 2 [sec] and shorter than 5 [sec], then a value determined from the graph in FIG. 5 is set for the limit range v2.

Next, a regular limit width dv on the deceleration side is calculated from the temporary limit width v1 and the limit range v2 that have been determined (step S4). Specifically, in accordance with Formula (3) given below, the smallest one out of the temporary limit width v1 and the limit range v2 is taken as the limit width dv on the deceleration side. Namely, the limit range dv is restricted to the range shown by the diagonal lines in FIG. 5.

$$dv=\min(v1, v2) \quad (3)$$

Once the limit range dv on the deceleration side has been calculated, the range limiter 22 executes a limit on the acceleration side that is based on the traveling speed vpre of the preceding vehicle for a temporary target vehicle speed vin that has been input (step S5). Specifically, in accordance with Formula (4) given below, the larger out of, for example, "the traveling speed vpre of the preceding vehicle+10 [km/h]" and the traveling speed v of the host vehicle is selected and taken as v0.

$$v0=\max(vpre+10 \text{ km/h}, v) \quad (4)$$

Subsequently, in accordance with Formula (5) given below, the smallest one out of the v0 calculated using Formula (4) and the temporary target vehicle speed vin is once again substituted for v0.

$$v0=\min(v0, vin) \quad (5)$$

Next, the range limiter 22 executes a limit on the deceleration side that is based on the traveling speed vpre of the preceding vehicle and on the limit width dv on the deceleration side that was calculated using the aforementioned Formula (3) (step S6). Specifically, in accordance with Formula (6) given below, the smaller out of, for example, "the traveling speed vpre of the preceding vehicle−the limit width dv" and the traveling speed v of the host vehicle is selected and taken as vout.

$$vout=\min(vpre-dv, v) \quad (6)$$

Subsequently, in accordance with Formula (7) given below, the larger one out of the v0 calculated using Formula (5) and the vout calculated using Formula (6) is once again substituted for vout.

$$vout=\max(v0, vout) \quad (7)$$

Lastly, the range limiter 22 executes a limit on the acceleration side that is based on the traveling speed v of the host vehicle [step S7]. Specifically, in accordance with Formula (8) given below, the smaller out of the vout calculated using the aforementioned Formula (7) and, for example, "the traveling speed v of the host vehicle+10 [km/h]" is once again substituted for vout.

$$vout=\min(vout, v+10 \text{ km/h}) \quad (8)$$

Figure 6:
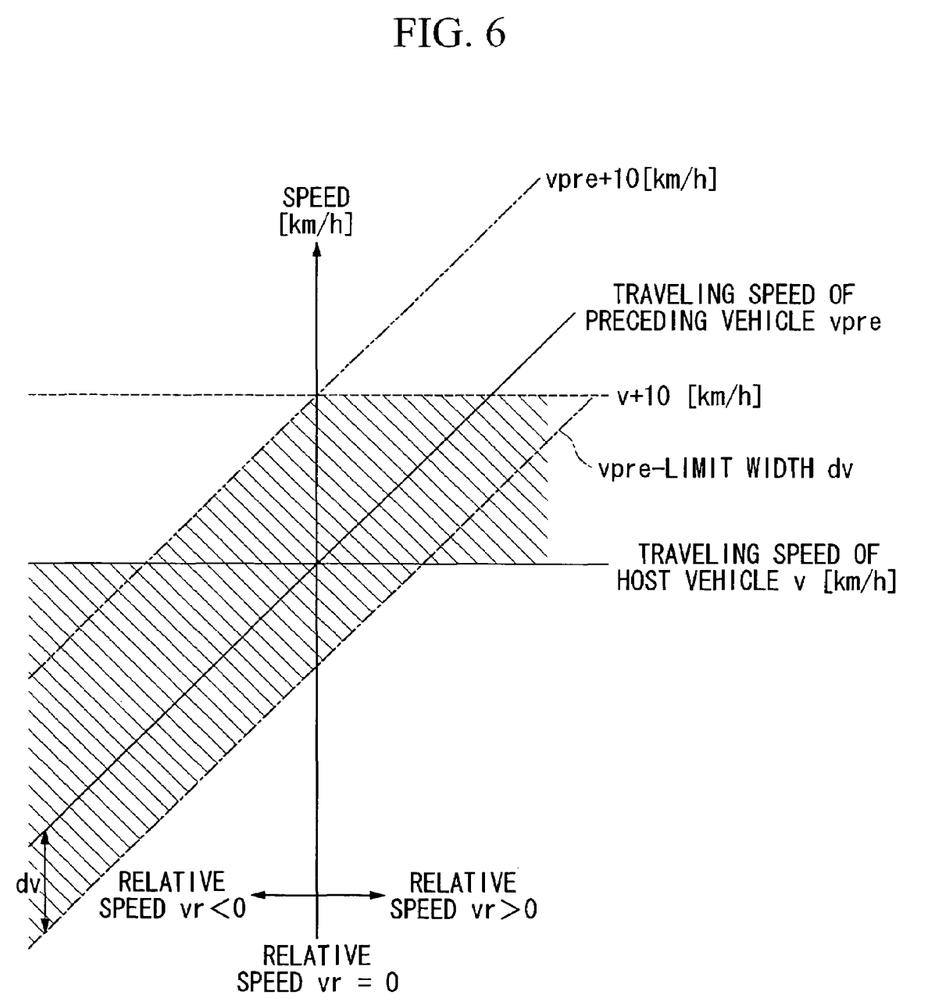
FIG. 6 is a view showing a relationship between a relative speed relative to a preceding vehicle and a calculated target speed.

As a result of the above processing, as in the diagram in FIG. 6 that shows a relationship between the relative speed vr of the host vehicle relative to the preceding vehicle and the calculated target vehicle speed, the target vehicle speed on the acceleration side is limited to the larger out of the traveling speed v of the host vehicle and "the traveling speed vpre of the preceding vehicle+10 km/h" in a range in which the relative speed vr of the host vehicle relative to the preceding vehicle is negative (i.e., vr<0). In addition, the target vehicle speed on the acceleration side is limited to "the traveling speed v of the host vehicle+10 km/h" in a range in which the relative speed vr of the host vehicle relative to the preceding vehicle is equal to or greater than 0 (i.e., vr≧0). In contrast, in all ranges, the target vehicle speed on the deceleration side is limited to whichever is the smaller out of "the traveling speed vpre of the preceding vehicle−the limit width dv" and the traveling speed v of the ghost vehicle. Namely, the target speed is limited to the range shown by the diagonal lines in FIG. 6.

Moreover, because the limit width dv on the deceleration side is changed by the traveling speed v of the host vehicle and by the predicted arrival time ctime when the host vehicle will reach the preceding vehicle, the target vehicle speed is provided with suitable limits in accordance with the relative positional relationship between the host vehicle and the preceding vehicle and the ongoing state thereof, or in accordance with the traveling speed of the host vehicle.

Figure 7:
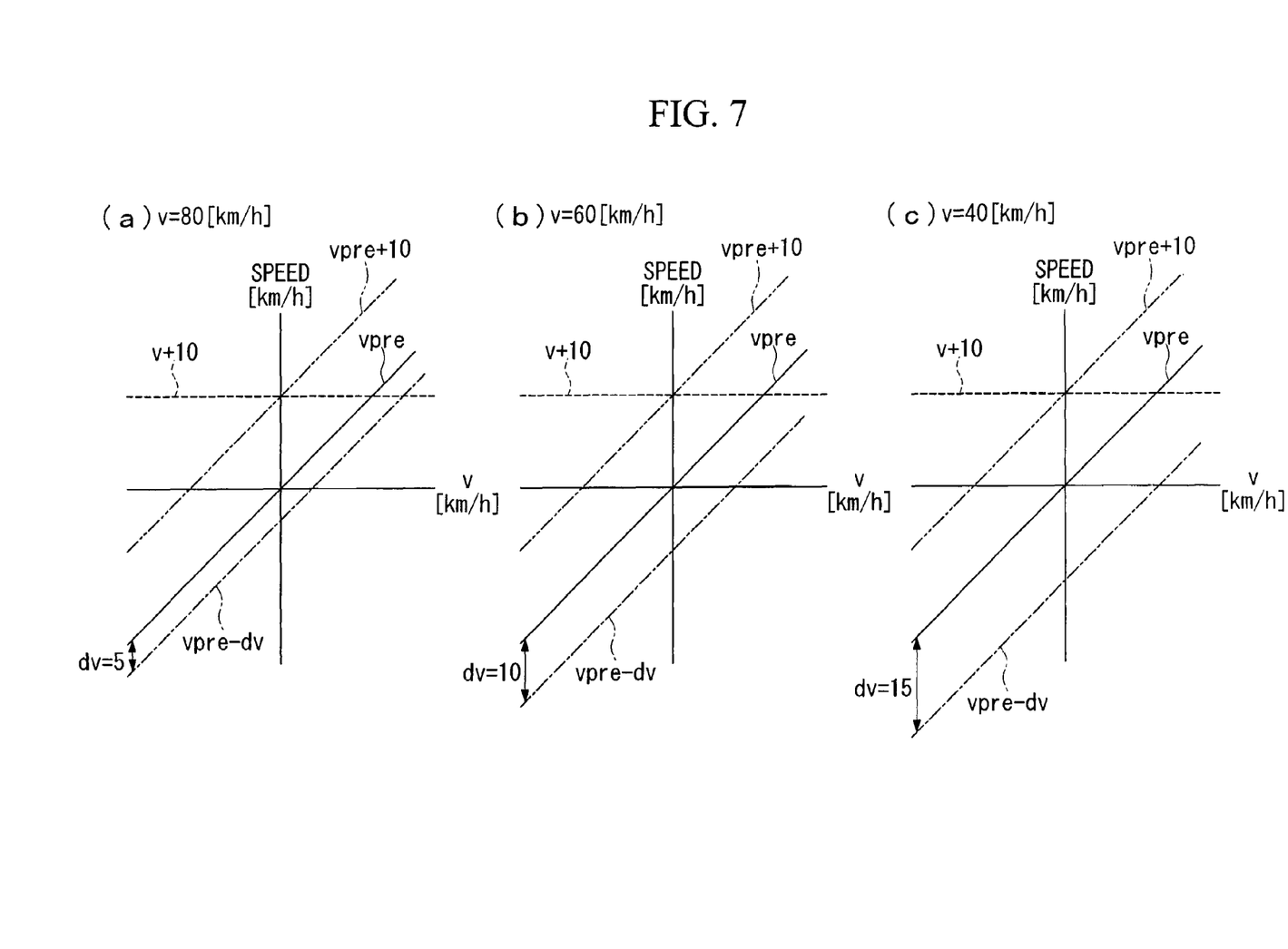
FIG. 7 is a view showing differences in the temporary limit width v1 for different traveling speeds of the host vehicle.

Specifically, as in the diagram in FIG. 7 that shows the differences in the temporary limit width v1 for different traveling speeds of the host vehicle, for example, when the traveling speed v of the host vehicle is 80 [km/h] as is shown in FIG. 7(a), the limit width dv on the deceleration side is limited to 5 [km/h]. When the traveling speed v of the host vehicle is 60 [km/h] as is shown in FIG. 7(b), the limit width dv on the deceleration side is limited to 10 [km/h]. When the traveling speed v of the host vehicle is 40 [km/h] as is shown in FIG. 7(c), the limit width dv on the deceleration side is limited to 15 [km/h].

Figure 8:
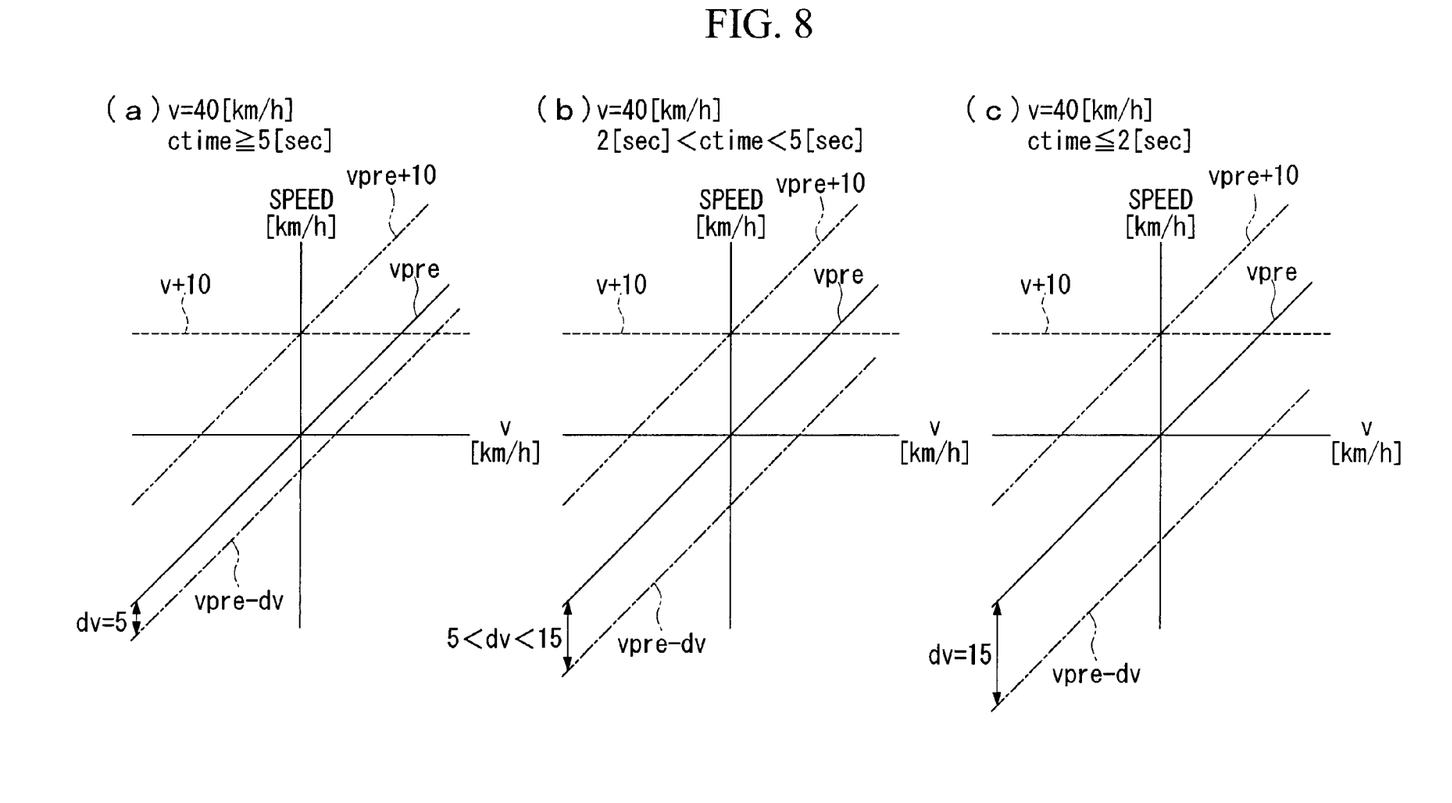
FIG. 8 is a view showing differences in the limit width dv on the deceleration side for different predicted arrival times when the host vehicle will reach the preceding vehicle.

Moreover, if the predicted arrival time ctime when the host vehicle will reach the preceding vehicle is short while the traveling speed of the host vehicle is the same 40 [km/h], the limit width dv on the deceleration side is further limited. Specifically, as in the diagram in FIG. 8 that shows the differences in the limit width d1 on the deceleration side for different predicted arrival times ctime when the host vehicle will reach the preceding vehicle, for example, when the traveling speed v of the host vehicle is 40 [km/h] and the predicted arrival time ctime when the host vehicle will reach the preceding vehicle is 5 [sec] or more as is shown in FIG. 8(a), the limit width dv on the deceleration side is limited to 5 [km/h].

In contrast, as is shown in FIG. 8(b), when the traveling speed v of the host vehicle is 40 [km/h] and the predicted arrival time ctime when the host vehicle will reach the preceding vehicle is longer than 2 [sec] and shorter than 5 [sec], the limit width dv on the deceleration side is limited to between 5 [km/h] and 15 [km/h]. Note that, as is shown in FIG. 8(c), when the traveling speed v of the host vehicle is 40 [km/h] and the predicted arrival time ctime when the host vehicle will reach the preceding vehicle is 2 [sec] or less, then because the limit width dv on the deceleration side is limited to 15 [km/h], the limit width dv on the deceleration side remains unchanged at the same 15 [km/h].

Note that the value of 10 [km/h] which is added to the traveling speed vpre of the preceding vehicle or the traveling speed v of the host vehicle is just an example for limiting the acceleration side in the above described target vehicle speed calculation operation, and any suitable value may be used provided that it enables abrupt acceleration of the host vehicle to be prevented.

In addition, in the present embodiment, the processing of step S1 that is executed by the range limiter 22 corresponds to the predicted arrival time calculation device, and the processing of steps S2 through S7 that is executed by the range limiter 22 corresponds to the target vehicle speed limiting device.

As has been described above, according to the apparatus for controlling the distance between vehicles of the present embodiment, when the target vehicle speed determining section 16 sets a target vehicle speed based on the distance deviation between the actual inter-vehicular distance and the target inter-vehicular distance between the host vehicle and the preceding vehicle that has been set by the target vehicle space determining section 15, and on the traveling speed of the preceding vehicle, the target vehicle speed determining section 16 calculates a temporary target vehicle speed based on the traveling speed of the preceding vehicle and on the aforementioned distance deviation using the temporary target vehicle speed determining section 21. In addition, the target vehicle speed determining section 16 calculates a predicted arrival time when the host vehicle will reach the preceding vehicle based on the actual inter-vehicular distance between the preceding vehicle and the host vehicle and on the relative speeds between the two using the range limiter 22. Moreover, the range limiter calculates a target vehicle speed limit value based on this predicted arrival time and on the traveling speed of the host vehicle, and sets as the target vehicle speed a value obtained by limiting the temporary target vehicle speed using this target vehicle speed limit value. In addition, the target vehicle speed determining section 16 controls the throttle control section 11 and the brake hydraulic pressure determining section 13 such that the host vehicle travels at the target speed.

As a result, while the apparatus for controlling the distance between vehicles executes inter-vehicular distance control between the host vehicle and the preceding vehicle without altering the target inter-vehicular distance settings, the apparatus for controlling the distance between vehicles is able to limit the target vehicle speed to a predetermined range based on the predicted arrival time and the traveling speed of the host vehicle, and it is possible to suppress the target vehicle speed from being greatly influenced by changes in the traffic situation around the host vehicle.

Accordingly, even if a new preceding vehicle cuts in between the host vehicle and the preceding vehicle that the host vehicle had hitherto been following, the effect is obtained that it is possible to obtain an apparatus for controlling the distance between vehicles that makes it possible, for example, for the host vehicle to follow without delay the deceleration of the new preceding vehicle, and that enables the inter-vehicular distance between the host vehicle and the new preceding vehicle to be restored smoothly to the target distance. In addition, the effect is obtained that it is possible to obtain an apparatus for controlling the distance between vehicles that executes inter-vehicular distance control using a suitable target vehicle speed for the host vehicle relative to the new preceding vehicle by performing a simple control procedure so that the driver does not feel an uncomfortable sensation.

Moreover, by limiting, in particular, the lower limit value of the target vehicle speed using the limit width dv on the deceleration side, it is possible to prevent the target vehicle speed from abruptly dropping to a lower speed in response to a change in the traffic situation around the host vehicle, and to thereby prevent the consequent sudden braking of the host vehicle. Furthermore, when there is an extended predicted arrival time when the host vehicle will reach the preceding vehicle or when the traveling speed of the host vehicle is slow, by reducing the limit width dv on the deceleration side, it is possible to prevent unnecessary sudden braking of the host vehicle, and to thereby prevent the behavior of the of the vehicle from becoming unstable.

Accordingly, the effect is obtained that it is possible to provide an apparatus for controlling the distance between vehicles that sets a suitable target vehicle speed in accordance with the relative positional relationship between the host vehicle and the preceding vehicle and the ongoing state thereof, or in accordance with the traveling speed of the host vehicle, and that enables the inter-vehicular distance between the host vehicle and the new preceding vehicle to be restored smoothly to the target distance, without making either the driver or a passenger feel an uncomfortable sensation, and without causing the vehicle to become unstable.

Figure 9:
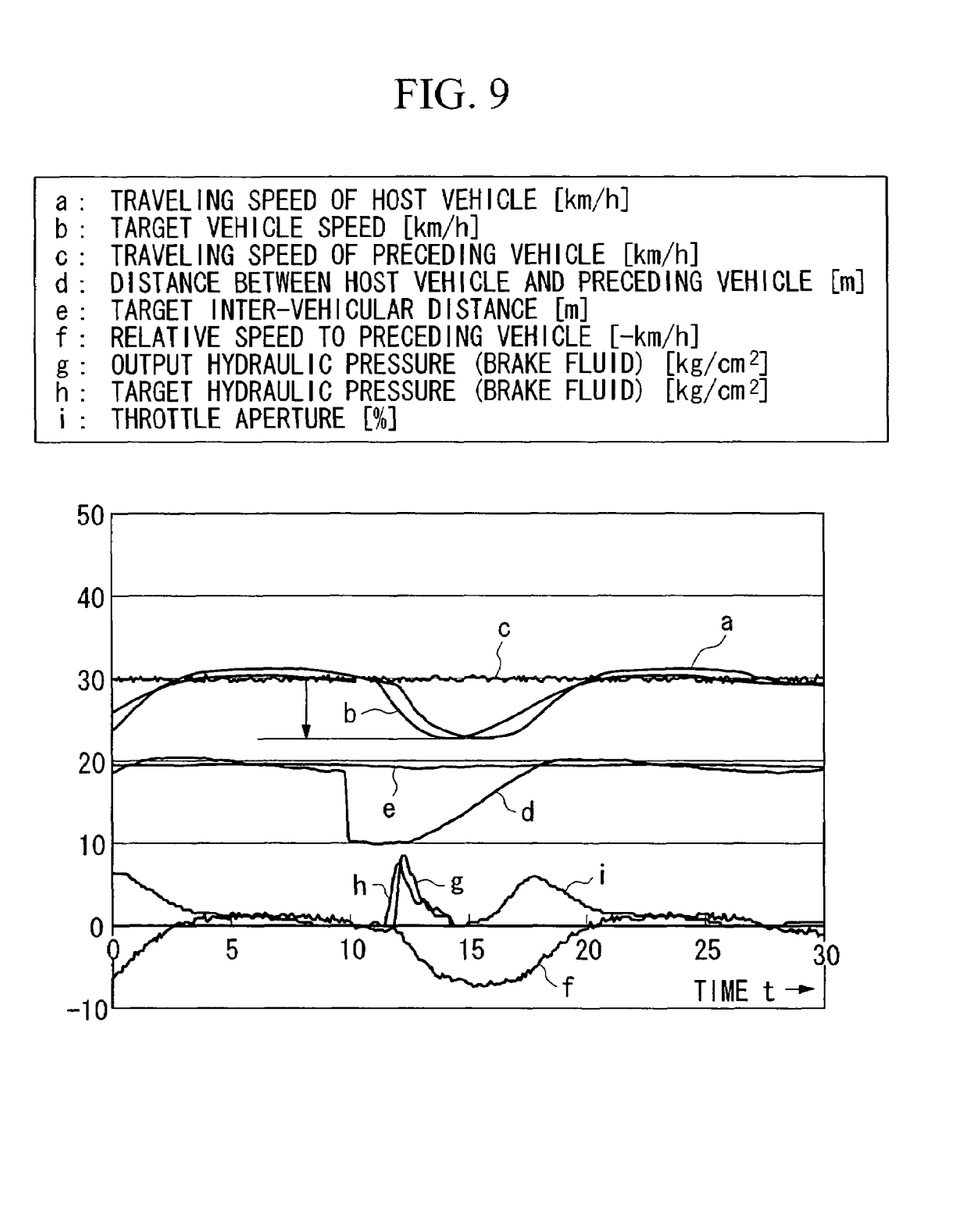
FIG. 9 is a view showing changes in respective control numbers when a new preceding vehicle has cut between the host vehicle and the preceding vehicle that the host vehicle had been following.
Figure 10:
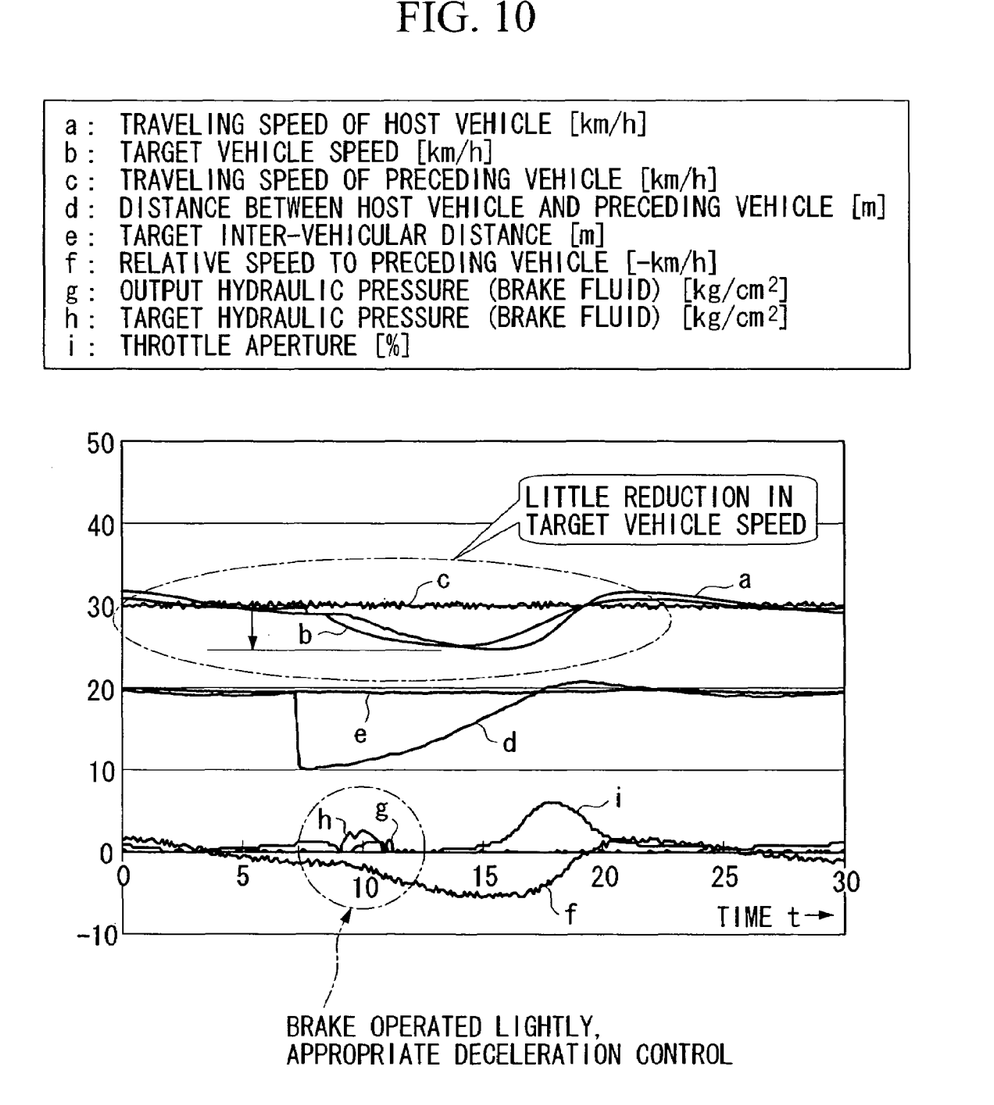
FIG. 10 is a view showing changes in respective control numbers when a new preceding vehicle has cut between the host vehicle and the preceding vehicle that the host vehicle had been following.

If this is described specifically using the drawings, FIGS. 9 and 10 are views showing changes in respective control numbers when a new preceding vehicle has cut in between the host vehicle and the preceding vehicle that the host vehicle had been following. FIG. 9 shows a case when a temporary target vehicle speed that has been calculated by the temporary target vehicle speed determining section 21 is used unchanged as a target vehicle speed without the range limiter 22 being operated. In contrast, FIG. 10 shows a case when, by operating the range limiter 22, limits are added to the temporary target vehicle speed that has been calculated by the temporary target vehicle speed determining section 21, and this is then used as the target vehicle speed. As can be seen when the two are compared, there is less reduction in the target vehicle speed when the range limiter 22 is operated, and it can be seen that appropriate deceleration control can be executed without the brakes being operated more than is necessary.

According to the apparatus for controlling the distance between vehicles of the present invention, while inter-vehicular distance control between the host vehicle and the preceding vehicle is executed without altering the target inter-vehicular distance settings, the target vehicle speed can be limited to a predetermined range, and it is possible to prevent the target vehicle speed from being greatly influenced by changes in the traffic situation around the host vehicle.

Accordingly, even if a new preceding vehicle cuts in between the host vehicle and the preceding vehicle that the host vehicle had hitherto been following, the effect is obtained that it is possible to realize an apparatus for controlling the distance between vehicles that makes it possible, for example, for the host vehicle to follow without delay the deceleration of the new preceding vehicle, and that enables the inter-vehicular distance between the host vehicle and the new preceding vehicle to be restored smoothly to the target distance. In addition, the effect is obtained that it is possible to realize an apparatus for controlling the distance between vehicles that executes inter-vehicular distance control using a suitable target vehicle speed for the host vehicle relative to the new preceding vehicle by performing a simple control procedure so that the driver does not feel an uncomfortable sensation.

Moreover, according to the apparatus for controlling the distance between vehicles of the present invention, by limiting the lower limit value of the target vehicle speed using the target vehicle speed limit value, it is possible to prevent the target vehicle speed from abruptly dropping to a lower speed in response to a change in the traffic situation around the host vehicle, and to thereby prevent the consequent sudden braking of the host vehicle.

Accordingly, the effect is obtained that it is possible to realize an apparatus for controlling the distance between vehicles that enables the inter-vehicular distance between the host vehicle and the new preceding vehicle to be restored smoothly to the target distance, without making either the driver or a passenger in the vehicle feel an uncomfortable sensation, and without causing the vehicle to become unstable.

Moreover, according to the apparatus for controlling the distance between vehicles of the present invention, it is possible to set an appropriate target vehicle speed in accordance with the relative positional relationship between the host vehicle and the preceding vehicle and with the ongoing state thereof.

Accordingly, particularly when there is a considerable distance between the host vehicle and a new preceding vehicle, or when there is a considerable difference in speed between the host vehicle and the new preceding vehicle so that there is a lengthy predicted arrival time when the host vehicle will reach the preceding vehicle, the effect is obtained that it is possible to realize an apparatus for controlling the distance between vehicles that prevents the behavior of the vehicle from becoming unstable due to the vehicle braking suddenly when this is not necessary, and that enables the inter-vehicular distance between the host vehicle and the new preceding vehicle to be restored smoothly to the target distance.

Moreover, according to the apparatus for controlling the distance between vehicles of the present invention, it is possible to set an appropriate target vehicle speed in accordance with the traveling speed of the host vehicle.

Accordingly, particularly when the host vehicle is traveling at a fast speed, the effect is obtained that it is possible to realize an apparatus for controlling the distance between vehicles that prevents the behavior of the vehicle from becoming unstable due to the vehicle braking suddenly when this is not necessary, and that enables the inter-vehicular distance between the host vehicle and the new preceding vehicle to be restored smoothly to the target distance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An apparatus for controlling a distance between vehicles comprising:
    a host vehicle speed detection device that detects a traveling speed of a host vehicle;
    a preceding vehicle determining device that determines which is a preceding vehicle;
    a target inter-vehicular distance setting device that sets a target inter-vehicular distance between the preceding vehicle and the host vehicle;
    an actual inter-vehicular distance detecting device that detects an actual inter-vehicular distance between the preceding vehicle and the host vehicle;
    a preceding vehicle speed calculating device that calculates a traveling speed of the preceding vehicle;
    a distance deviation calculating device that calculates a distance deviation between the target inter-vehicular distance and the actual inter-vehicular distance;
    a target vehicle speed setting device that sets a target vehicle speed based on the traveling speed of the preceding vehicle and on the distance deviation; and
    an acceleration/deceleration control unit that controls an acceleration and a deceleration of the host vehicle based on the target vehicle speed, wherein
    the target vehicle speed setting device comprises: a predicted arrival time calculating device that calculates a predicted arrival time when the host vehicle will reach the preceding vehicle based on the actual inter-vehicular distance and on a relative speed between the preceding vehicle and the host vehicle; and a target vehicle speed limiting device that calculates a target vehicle speed limit value based on the predicted arrival time and on the traveling speed of the host vehicle, and
    the target vehicle speed setting device sets a target vehicle speed based on the target vehicle speed limit value.

2. The apparatus for controlling the distance between vehicles according to claim 1, wherein the target vehicle speed setting device takes a value obtained by subtracting a target vehicle speed limit value from the traveling speed of the preceding vehicle as a target vehicle speed lower limit value.

3. The apparatus for controlling the distance between vehicles according to claim 1, wherein, as the predicted arrival time increases, the target vehicle speed setting device reduces the target vehicle speed limit value.

4. The apparatus for controlling the distance between vehicles according to claim 2, wherein, as the predicted arrival time increases, the target vehicle speed setting device reduces the target vehicle speed limit value.

5. The apparatus for controlling the distance between vehicles according to claim 1, wherein, as the traveling speed of the host vehicle increases, the target vehicle speed setting device reduces the target vehicle speed limit value.

6. The apparatus for controlling the distance between vehicles according to claim 2, wherein, as the traveling speed of the host vehicle increases, the target vehicle speed setting device reduces the target vehicle speed limit value.

7. The apparatus for controlling the distance between vehicles according to claim 3, wherein, as the traveling speed of the host vehicle increases, the target vehicle speed setting device reduces the target vehicle speed limit value.

8. The apparatus for controlling the distance between vehicles according to claim 4, wherein, as the traveling speed of the host vehicle increases, the target vehicle speed setting device reduces the target vehicle speed limit value.

* * * * *